April 2, 1946.   C. E. SORENSEN   2,397,816
EXHAUST TURBOSUPERCHARGER
Filed Feb. 9, 1942   2 Sheets-Sheet 1
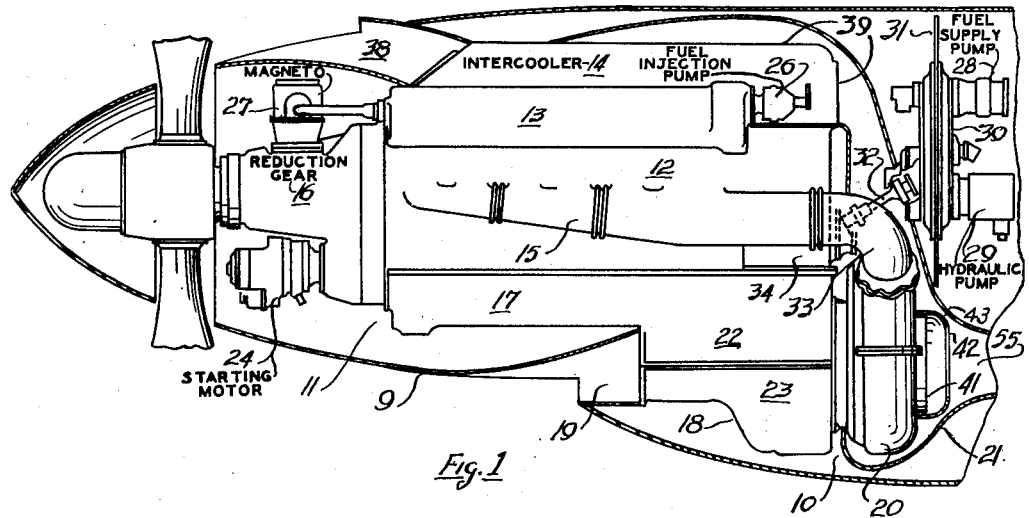
Fig. 1
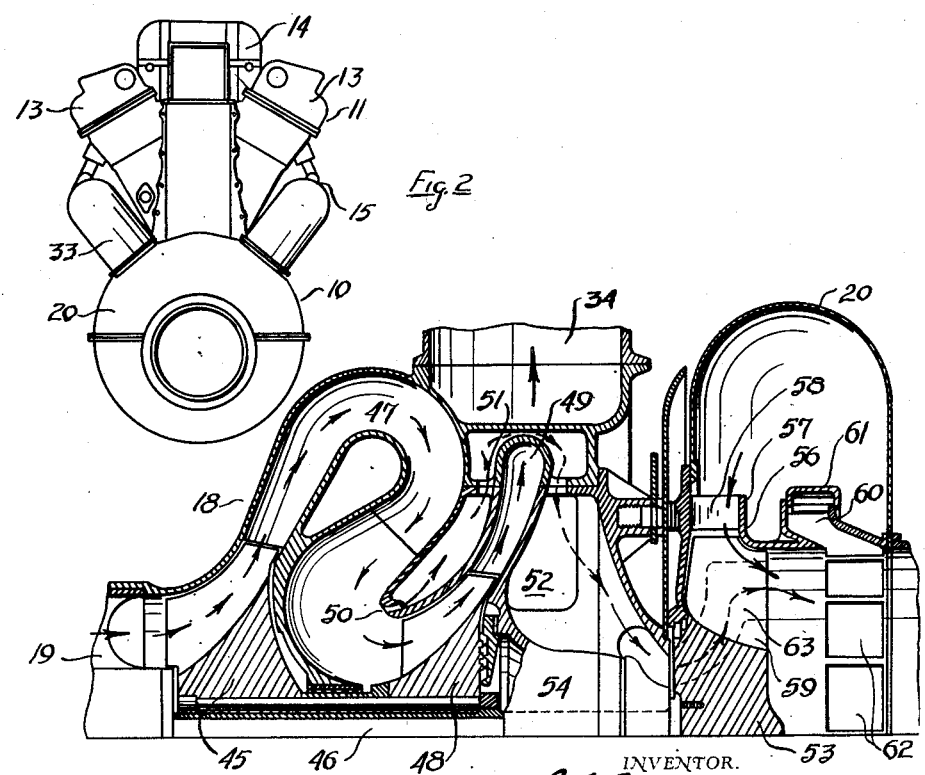
Fig. 2
Fig. 3
INVENTOR.
C. E. Sorensen
BY
ATTORNEYS.

Patented Apr. 2, 1946

2,397,816

UNITED STATES PATENT OFFICE 2,397,816

EXHAUST TURBOSUPERCHARGER

Charles E. Sorensen, Detroit, Mich., assignor to Ford Motor Company, Dearborn, Mich., a corporation of Delaware Application February 9, 1942, Serial No. 430,118

6 Claims. (Cl. 60—35.6)

This invention relates to aircraft power-plant construction and is particularly directed to an improved arrangement of the engine, a turbosupercharger assembly and the fuselage or nacelle by means of which the exhaust from the engine, together with the air used for other purposes therein, is more fully utilized, and the drag ordinarily incident thereto is avoided.

Supercharging has been found to be indispensable in all but the smallest commercial and military aircraft, particularly to maintain the operating characteristics of the power plant at the altitudes at which this craft must operate. This need has been met by the development of several types of superchargers, the most promising of which use a centrifugal fan, either gear driven from the engine or by a turbine operating on the exhaust from the engine. In either case, this represents a reduction in the potential horsepower output of the engine and it is essential that the power requirements of the supercharger be kept to a minimum. In the case of a direct-drive supercharger, the power requirement varies from 5 per cent to 10 per cent of the total power output of the engine and this is a direct and fundamentally irreducible power loss (except for such minor gains as may be made by refinement in design).

Theoretically, at least, the exhaust-driven turbosupercharger has the advantage that it requires a smaller percentage of the engine's available power output since it utilizes energy that otherwise would be lost. Of course, the placing of a turbine in the exhaust line increases the back pressure and the temperature of the exhaust at the exhaust valve, both of which lead to a decrease in the engine efficiency. In spite of this increased pressure and temperature, the exhaust energy, when utilized in the turbine, represents a net gain.

The principal difficulties have been encountered in designing apparatus that will work at the high temperatures involved and which will be within dimensional and weight limits required for aircraft practice and usually it is mounted at the extreme front of the engine. Obviously, some form of cooling must be provided and this requires that the turbine be interposed in an air stream, direct or deflected. This immediately leads either to an increase in the frontal area of the assembly or complication and addition of weight in the fuselage; and, moreover, the cooling so obtained represents a thermal loss. Also to be considered is the fact that the turbosupercharger assembly has necessarily a somewhat bulky apparatus which, as ordinarily disposed, represents so much "built-in head wind."

It is therefore an object of this invention to devise a turbosupercharger assembly with an engine which, by a novel arrangement of the turbine and fan together with the engine exhaust connection, the air supply and the delivery connection, avoids an increase in the frontal area in the engine. Another object is to utilize more of the thermal energy of the engine exhaust both in the operation of the supercharger and in obtaining an increased propulsive effect. That is to say, it is the intention to so locate and localize the energy resident in the exhaust to obtain a propulsive effort which at least offsets the increased drag which heretofore has always accompanied the installation of a turbosupercharger unit.

With these and other objects in view, the invention consists in the arrangement, construction and combination of the various parts of the improved device, described in this specification, claimed in the claims, and illustrated in the accompanying drawings, in which:

Figure 1 is an elevation of the engine and supercharger combination of this invention, the associated fuselage being shown in sections.

Figure 2 is an elevation of the rear end of the combination.

Figure 3 is a vertical, longitudinal section through a portion of the fan and turbine combination shown on an enlarged scale.

Figure 4:
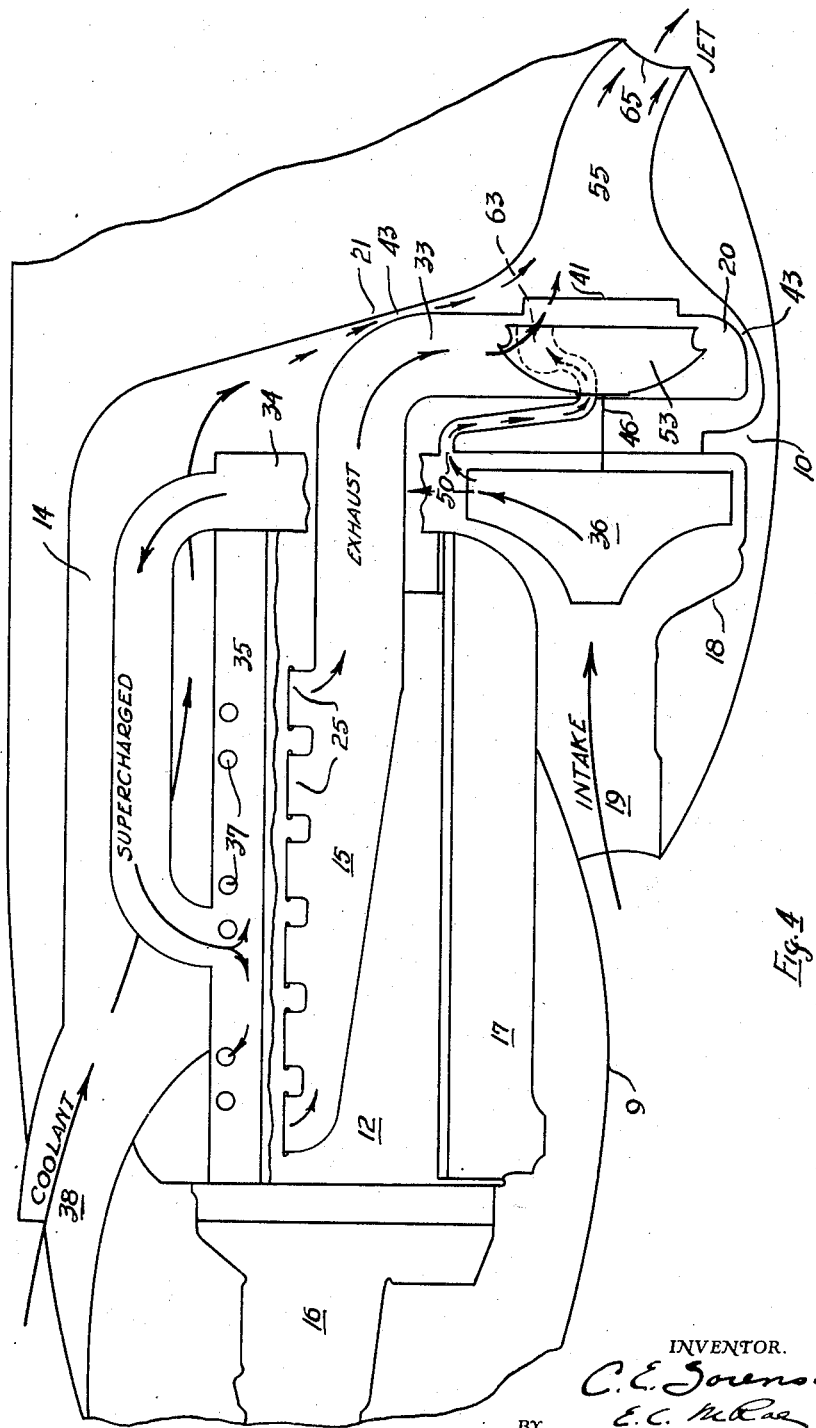
Figure 4 is an elevation on an enlarged scale showing the arrangement diagrammatically.

Referring particularly to Figure 1, the general assembly of the fuselage or nacelle 9 with the turbosupercharger unit 10 and the engine 11 is shown. The major components of the engine 11 include the block 12, the heads 13, the intercooler 14, the exhaust manifold 15, the reduction gear housing 16, and the crankcase 17.

The turbosupercharger assembly has as its essential elements the fan housing 18, the air scoop 19, the exhaust turbine 20, and the turbine manifolding 21. The upper half 22 of the fan housing 18 is preferably cast integral with the crankcase 17, which, together with the lower half 23, supports the riser 34 and furnishes a rigid support for the turbine housing 20.

Associated with the engine and more properly referred to as accessories are the starting motor 24, the fuel-injection pumps 26 and the magneto 27. There are many accessories, including the oil and fuel supply pumps 28 and hydraulic pumps 29, preferably mounted in a group 30 inwardly of the motor and separated therefrom by a bulkhead 31 and driven in synchronism with the engine by a shaft 32. This is a highly advantageous construction and insures synchronism of the related accessories and groups them together where they can be handled as a unit and protected from motor heat or fire.

Reference to Figure 2 shows that the exhaust manifold 15 and the down-lead 33 are arranged well within the lines established by the cylinder heads 13 so that these elements do not add to the frontal area. Similarly, the inter-cooler 14 is disposed within the V, thereby reducing the height of the engine.

Figure 4 indicates diagrammatically the general flow of exhaust and cooling air with relation to the engine and turbosupercharger, while Figure 3, which is a half sectional view through the turbosupercharger, shows the details of construction as well as the internal flow arrangement provided. Referring to Figure 4, it will be noted that the exhaust gases are collected from the exhaust ports of the various cylinders in the manifold 15, running alongside these cylinders on the outer faces of the V, and pass through the down-leads 33 on either side of the engine to the turbine housing 20. The air for combustion is picked up by the air scoop 19, compressed in the centrifugal blower 36 and is then discharged into the riser 34 leading into the intercooler 14, where it is cooled and admitted to the intake manifold 35 for subsequent admission to the various cylinders through intake ports. The intake manifold preferably comprises the space between the V which is covered in by the intercooler.

The cooling of the combustion air is effected by a current of air picked up in the scoop 38 and forced, due to the forward velocity of the ship, through the intercooler and thence exhausted from the top and back surfaces 39 to the turbine manifolding 21. This cooling air has its temperature raised in the intercooler and has considerable energy content due both to the thermal addition in the intercooler and the pressure component resulting from the forward speed of the plane. This air then flows through and surrounds the turbine housing 20 affording some cooling effect. The turbine exhaust port 41 has associated with it the ring 42 which is based on the turbine manifold to form a circumferential ejector nozzle 43. The restricted discharge area of the nozzle increases the velocity of the air flowing through it, providing a lowering of the back pressure on the turbine.

The air for combustion is picked up by the scoop 19 and (as shown in Figure 3) passes from the first-stage impeller 45 secured to the shaft 46. This runner discharges to the first-stage ring 47, from which it is delivered to the second-stage impeller 48, also secured to the shaft 46. The second impeller discharges to the delivery volute 49 which is connected with the intake duct to the engine.

It will be noted that a bleed 50 is provided in the first-stage ring, from which air under pressure is delivered through connecting ports 51 in the support of the delivery volute 49 to a receiving chamber 52 adjacent to and in communication with the front face of the turbine runner 53. This chamber also includes the bearing 54 for the shaft 46 at the rearward end of which the turbine 53 is attached. Thus, the intake air is delivered under compression through the two stages provided to the riser 34 from which it flows to the intercooler 14 as described above. A portion of the air escapes through the bleed 50 and is under pressure in the receiving chamber 52.

The exhaust gases are picked up in the exhaust manifold 15 from the several exhaust ports 25 of the cylinders and flow to the down-leads 33 and then to the turbine housing 20. The latter has an internal fixed ring 56 which is provided with two circumferential series of ports. The forward ports 57 have entry vanes 58 and it is through these that the exhaust gas is normally admitted to the blades 59 of the turbine. The rear ports 60 have a movable cooperating gate ring 61, which may be moved longitudinally to open or shut the ports and hence by-pass the exhaust gas from the turbine housing directly to the exhaust port 41 through the apertures 62. This waste gate is controlled both automatically and by the operator of the plane to obtain the desired supercharge.

The blades 59 of the turbine are hollowed out as indicated by the dotted lines forming channels 63, the forward ends being in communication with the receiving chamber 52 and the rearward ends being in communication with the exhaust port 40 of the turbine. Thus, the air which has been bled from the first stage is available and under sufficient pressure to force it through the channel 63 in each of the blades 59 of the turbine, thereby cooling the blades. However, the air so forced through is in turn heated and correspondingly expanded.

It will now be seen that all of the air admitted to the engine—namely, that for combustion, that for cooling the intercooler and that used for cooling the turbine—is now collected in the exhaust chamber 55. Moreover, the air is under such conditions of pressure, thermal content, and velocity as to have considerable energy available to increase the propulsive effort of the engine.

Referring to Figure 4, it will be seen that the exhaust port 41 is in communication with the receiving chamber 55 which in turn is reduced in cross-sectional area to form the exhaust nozzle 65, directed rearwardly of the fuselage or nacelle. This gas is available for use in jet propulsion to increase, proportionately, the propulsive efforts of the engine. That is to say, the energy which it still possesses may readily be utilized in creating a stream or jet of gas whose velocity will give a propulsive effect and hence increase the over-all power of the engine.

Theoretically, the reactive forces of gases leaving a moving source are available to impose a propulsive force on the source. Actually, practical and sustained flight by jet propulsion alone has not been achieved; but any increment in propulsive force that can be obtained in a conventional aircraft is not to be disregarded.

In this respect, the turbosupercharger combination must be distinguished from the direct-drive supercharger largely used heretofore. The direct-drive supercharger, of course, has no problem incident to heating, since there is no heat dissipation in the turbine, and it has no exhaust to be utilized for the same reason. By mounting the turbosupercharger assembly in the position shown, absolute rigidity of support can be obtained for the fan and its delivery duct, since a portion of the fan housing may be integral with the engine's crankcase and the remainder of the housing securely attached to it. The turbine, on the other hand, is subjected to the higher temperatures and is an independent unit secured to the impeller housing at its central portion where the expansion is at a minimum. Moreover, the design of the cooling duct in the turbine blade is such that the entry is also adjacent this point. Thus, both the turbine-shaft bearing and the turbine-housing-attaching means are cooled by the air circulated around them before it is admitted to the blade channels.

Some changes may be made in the arrangement, construction and combination of the various parts of the improved device without departing from the spirit of the invention and it is the intention to cover by the claims such changes as may reasonably be included within the scope thereof.

I claim as my invention:

1. In an aircraft engine and turbosupercharger assembly, an internal-combustion engine, a centrifugal supercharger associated therewith, an exhaust-driven turbine drivingly connected to said supercharger and in substantial axial alignment therewith, an air intake means connected to said supercharger and extending forwardly thereof, an air delivery means connected to said supercharger and extending to the intake manifolding of said engine, means employing air currents to cool the air in said delivery means, a receiving chamber connected to and extending rearwardly of said turbine, and means conducting said coolant air from said delivery means to said receiving chamber, said last-described means including housing structure discharging said cooling air into said receiving chamber with an ejector effect.

2. In an aircraft engine and turbosupercharger assembly, an internal-combustion engine, a centrifugal supercharger associated therewith, an exhaust-driven turbine drivingly connected to said supercharger and in substantial axial alignment therewith, air intake means connected to said supercharger and extending forwardly thereof, air delivery means connected to said supercharger and extending to the intake manifolding of said engine, means interposed in said air delivery means to cool the supercharged air therein by means of independent air currents, a receiving chamber connected to and extending rearwardly of said turbine, means conducting the air used to cool said supercharged air to said receiving chamber, and means supplying air under pressure adjacent the forward face of said turbine to cool the same.

3. In an aviation motor and turbosupercharger assembly, an internal-combustion engine, a centrifugal supercharger associated therewith, an exhaust-driven turbine drivingly connected with said supercharger and arranged in substantial axial alignment therewith, an air intake means connected with said supercharger and extending forwardly thereof, a receiving chamber connected to the exhaust port of said turbine and extending rearwardly therefrom, air delivery means extending from said supercharger to the manifold of said engine, cooling means interposed in said air delivery means whereby the supercharged air may be cooled by independent air currents, and means for delivering coolant air under substantial pressure to the forward face of said turbine to cool the same, said last-named air also discharging into said receiving chamber.

4. In an aviation motor and turbosupercharger assembly, an internal-combustion engine, a centrifugal supercharger associated therewith at the rear and adjacent the lower quarter of said engine, an exhaust turbine substantially axially aligned behind said supercharger and drivingly connected thereto, air intake means extending substantially axially forwardly of said supercharger, a main delivery conduit from said supercharger leading to said engine, a secondary delivery conduit leading from said supercharger to an intake chamber adjacent the runner of said turbine, a housing surrounding said runner and communicating with the exhaust ports of said engine, valve means selectively controlling the flow of exhaust gases in said housing between the vanes of said runner and to a receiving chamber extending from said runner rearwardly, passageways formed in the vanes of said runner, said passageways connecting forwardly with said intake chamber and rearwardly with said receiving chamber.

5. In an aviation motor and turbosupercharger assembly, an internal-combustion engine, a centrifugal supercharger associated therewith, an exhaust-driven turbine axially and drivingly connected with said supercharger and located rearwardly thereof, intake means extending forwardly of said supercharger, delivery means from said supercharger to said engine, cooling means interposed in said delivery means, an exhaust chamber extending rearwardly from said turbine housing, conduits leading from the exhaust ports of said engine to said housing, a turbine runner in said housing having its inlet adjacent the periphery thereof and discharging to said exhaust chamber, valve means in said housing to selectively direct the exhaust gases to said runner or to said exhaust chamber, means to conduct the coolant from said cooling means to said exhaust chamber, means to admit a cooling stream to said turbine runner, means to conduct said stream to said exhaust chamber, and a nozzle connected with said exhaust chamber and directed rearwardly thereof and longitudinally of said engine.

6. In an internal-combustion engine and turbosupercharger assembly, a centrifugal supercharger housing at least a portion of which is integral with said engine, a shaft journaled in said housing, an impeller secured to said shaft forwardly of said journal, a turbine runner secured to said shaft rearwardly of said journal, an independent turbine housing surrounding said runner and secured to said housing, means for delivering air under pressure from said impeller to a chamber encompassing the outer surface of said journal and adjacent that portion of the supercharger housing supporting the turbine housing.

CHAS. E. SORENSEN.